(12) United States Patent
Yie et al.

(10) Patent No.: US 9,544,641 B2
(45) Date of Patent: Jan. 10, 2017

(54) HYBRID TRANSMISSION METHOD THROUGH MMT PACKET FORMAT EXTENSION

(71) Applicant: HUMAX CO., LTD., Yongin-si Gyeonggi-do (KR)

(72) Inventors: Alex Chungku Yie, Incheon (KR); Yong-Jae Lee, Seongnam-si (KR); Hui Kim, Namyangju-si (KR)

(73) Assignee: HUMAX CO., LTD., Yongin-Si, Gyeonggi-Do (KR)

( * ) Notice: Subject to any disclaimer, the term of this patent is extended or adjusted under 35 U.S.C. 154(b) by 0 days.

(21) Appl. No.: 14/395,748

(22) PCT Filed: May 5, 2013

(86) PCT No.: PCT/KR2013/004191
§ 371 (c)(1),
(2) Date: Oct. 20, 2014

(87) PCT Pub. No.: WO2013/169084
PCT Pub. Date: Nov. 14, 2013

(65) Prior Publication Data
US 2015/0113577 A1    Apr. 23, 2015

(30) Foreign Application Priority Data

May 10, 2012   (KR) .................. 10-2012-0049873
May 10, 2013   (KR) .................. 10-2013-0053131

(51) Int. Cl.
*H04N 21/438*   (2011.01)
*H04N 21/81*   (2011.01)
(Continued)

(52) U.S. Cl.
CPC ........ *H04N 21/438* (2013.01); *H04L 65/4076* (2013.01); *H04N 21/2362* (2013.01);
(Continued)

(58) Field of Classification Search
CPC .............. H04N 21/438; H04N 21/8133; H04N 21/2362; H04N 21/23602; H04N 21/23605; H04N 21/2381; H04N 21/234327; H04N 21/4345; H04N 21/4381

See application file for complete search history.

(56) References Cited

U.S. PATENT DOCUMENTS

2005/0043020 A1   2/2005   Lipsanen et al.
2008/0062318 A1*  3/2008   Ellis .................... H04N 5/44543
                                                              348/564
(Continued)

FOREIGN PATENT DOCUMENTS

JP    2008-263434 A    10/2008
KR    10-0935303 B1    12/2009
KR    10-2011-0117033 A    10/2011

OTHER PUBLICATIONS

International Search Report of PCT/KR2013/004191 dated on Sep. 30, 2013.

*Primary Examiner* — Hai V Tran
(74) *Attorney, Agent, or Firm* — Hauptman Ham, LLP

(57) ABSTRACT

Disclosed is a method for hybrid transmission over a broadcast network and a broadband network, comprising the steps of: providing information on the broadcast content relating to a first content during the viewing the first content of the broadband network; and, if the related broadcast content is selected, providing the related broadcast content to a user over the broadcast network. The user may receive the broadcast content corresponding to relevant specific content over the broadcast network and view the received broadcast content during the viewing of specific VOD content in the broadcast network.

31 Claims, 9 Drawing Sheets

(51) Int. Cl.
    *H04N 21/2381*     (2011.01)
    *H04N 21/2665*     (2011.01)
    *H04N 21/61*     (2011.01)
    *H04N 21/63*     (2011.01)
    *H04L 29/06*     (2006.01)
    *H04N 21/2362*     (2011.01)
    *H04N 21/643*     (2011.01)
    *H04N 21/433*     (2011.01)
    *H04N 21/472*     (2011.01)

(52) U.S. Cl.
    CPC ..... *H04N 21/2381* (2013.01); *H04N 21/2665* (2013.01); *H04N 21/433* (2013.01); *H04N 21/47202* (2013.01); *H04N 21/6125* (2013.01); *H04N 21/6175* (2013.01); *H04N 21/631* (2013.01); *H04N 21/64322* (2013.01); *H04N 21/8133* (2013.01)

(56) References Cited

U.S. PATENT DOCUMENTS

| | | | |
|---|---|---|---|
| 2009/0158325 A1 | 6/2009 | Johnson et al. | |
| 2012/0185907 A1* | 7/2012 | Park | H04N 21/236 725/110 |
| 2013/0173826 A1* | 7/2013 | Kim | H04N 21/4307 709/248 |
| 2015/0020131 A1* | 1/2015 | Choi | H04N 21/234327 725/109 |
| 2015/0089560 A1* | 3/2015 | Park | H04N 21/23605 725/116 |

* cited by examiner

HYBRID TRANSMISSION METHOD THROUGH MMT PACKET FORMAT EXTENSION

BACKGROUND OF THE INVENTION

Field of the Invention

The present invention relates to a hybrid transmission using a heterogeneous network.

Related Art

After standardization of MPEG-2, new video compression standards (or audio compression standards) such as MPEG-4, H.264/AVC, and scalable video coding (SVC) have been developed for the last 10 years, and these new standards have formed new markets, thereby extending the utilized area of MPEG standards, but the transmission technology such as MPEG-2 transport system (TS) has been widely used in a digital broadcast and a mobile broadcast (T-DMB, DVB-H, etc.) without a significant change for about 20 years and is even being used in IPTV service which is multimedia transmission through Internet.

However, multimedia transmission environments at the time of development of MPEG-2 TS and the today's multimedia transmission environments are quite different. For example, the MPEG-2 TS standard has been developed in consideration of multimedia data through ATM network at the time of establishment, but today this standard is rarely used for this purpose. Further, requirements such as multimedia transmission by using Internet at the time of establishment of MPEG-2 TS standard have not been considered, and thus there are elements which are not efficient in recent multimedia transmission through Internet. Hence, establishment of MPEG media transport (MMT), which is a new multimedia transport standard which considers the multimedia service in Internet and fits a changing multimedia environment, is being recognized as a very important subject.

Likewise, MMT standardization is important because the MPEG2-TS standard, which was made 20 years ago, is not optimized for the today's IPTV broadcast service, Internet environment, etc., and thus there is a need for an international multimedia transmission standard which is optimized for the multimedia transmission environment in various heterogeneous networks.

In particular, various application examples for hybrid transmission through a broadcast network and a broadband network cannot be supported only with the existing MPEG2 TS standards.

SUMMARY OF THE INVENTION

An object of the present invention is to provide a hybrid transmission method for supporting a hybrid delivery by extending a packet format of MMT.

In accordance with an aspect of the present invention, a hybrid transmission method which uses at least one of a broadcast network and a broadband network includes providing information on a broadcast content associated with a first content while viewing the first content, and providing the associated broadcast content to a user through the broadcast network.

In accordance with another aspect of the present invention, a hybrid transmission method which uses a broadcast network and a broadband network includes transmitting a first content by using at least one of a data storage, a broadband network, and a broadcast network, in which the transmitting of the first content further includes transmitting information associated with the first content.

In accordance with another aspect of the present invention, a hybrid reception method which uses at least one of a broadcast network and a broadband network includes receiving a first content, wherein the receiving of the first content further includes receiving information associated with the first content while receiving the first content.

The first content may be received by using at least one of a data storage, a broadband network, and a broadcast network.

Information associated with the first content may be information of a broadcast content associated with the first content.

The receiving of information associated with the first content may further include receiving broadcast content associated with the first content when the broadcast content associated with the first content is selected.

The broadcast content associated with the first content may be received along with the first content.

The receiving of the broadcast content associated with the first content may be performed by receiving the broadcast content in real time at the time of providing the broadcast content.

The receiving of the broadcast content associated with the first content may further include storing the broadcast content.

The information associated with the first content may be included in at least one of an MPEG media transport (MMT) packet, an MMT packet header, an MMT payload, an MMT payload header, an MMT asset, an MMT asset header, asset delivery characteristics (ADC), MMT-composition information (MMT-CI), an MMT processing unit (MPU), and an MMT fragment unit (MFU).

The information associated with the first content may be at least one of program specific information (PSI), a program association table (PAT), a program map table (PMT), an advanced program map table (APMT), and a program ID (PID).

In accordance with another aspect of the present invention, a hybrid transmission device which uses at least one of a broadcast network and a broadband network includes an MMT packet generation unit which receives an MMT payload and generates an MMT packet, and an MMT packet transmission unit which transmits the generated MMT packet, wherein the MMT packet includes a first content and information associated with the first content.

The MMT packet transmission unit may transmit the MMT packet by using at least one of a data storage, a broadband network, and a broadcast network.

In accordance with an aspect of the present invention, a hybrid reception device which uses at least one of a broadcast network and a broadband network includes an MMT packet reception unit which receives a transmitted MMT packet, wherein the MMT packet includes a first content and information associated with the first content.

The MMT packet reception unit may receive the MMT packet by using at least one of a data storage, a broadband network, and a broadcast network.

Information associated with the first content may be information of a broadcast content associated with the first content.

The MMT reception unit may receive an MMT packet including broadcast content associated with the first content when the broadcast content associated with the first content is selected.

The MMT reception unit may receive an MMT packet including the broadcast content associated with the first content in real time according to the provision time of the broadcast content.

The hybrid reception device may further include a data storage for storing data, wherein the data storage stores the broadcast content which is generated from the MMT packet including the broadcast content associated with the first content.

The information associated with the first content may be included in at least one of an MPEG media transport (MMT) packet, an MMT packet header, an MMT payload, an MMT payload header, an MMT asset, an MMT asset header, asset delivery characteristics (ADC), MMT-composition information (MMT-CI), an MMT processing unit (MPU), and an MMT fragment unit (MFU).

The information associated with the first content may be at least one of program specific information (PSI), a program association table (PAT), a program map table (PMT), an advanced program map table (APMT), and a program ID (PID).

Effects of the Invention

According to the above-described hybrid transmission method through packet format extension of MMT, information on content corresponding to specific content may be provided through a broadcast network while viewing a specific VOD content through a broadband network.

Further, when the associated broadcast content is selected, the user may receive and view the associated broadcast content by transmitting the associated broadcast content to the user through a broadcast network.

DESCRIPTION OF EXEMPLARY EMBODIMENTS

Figure 1:
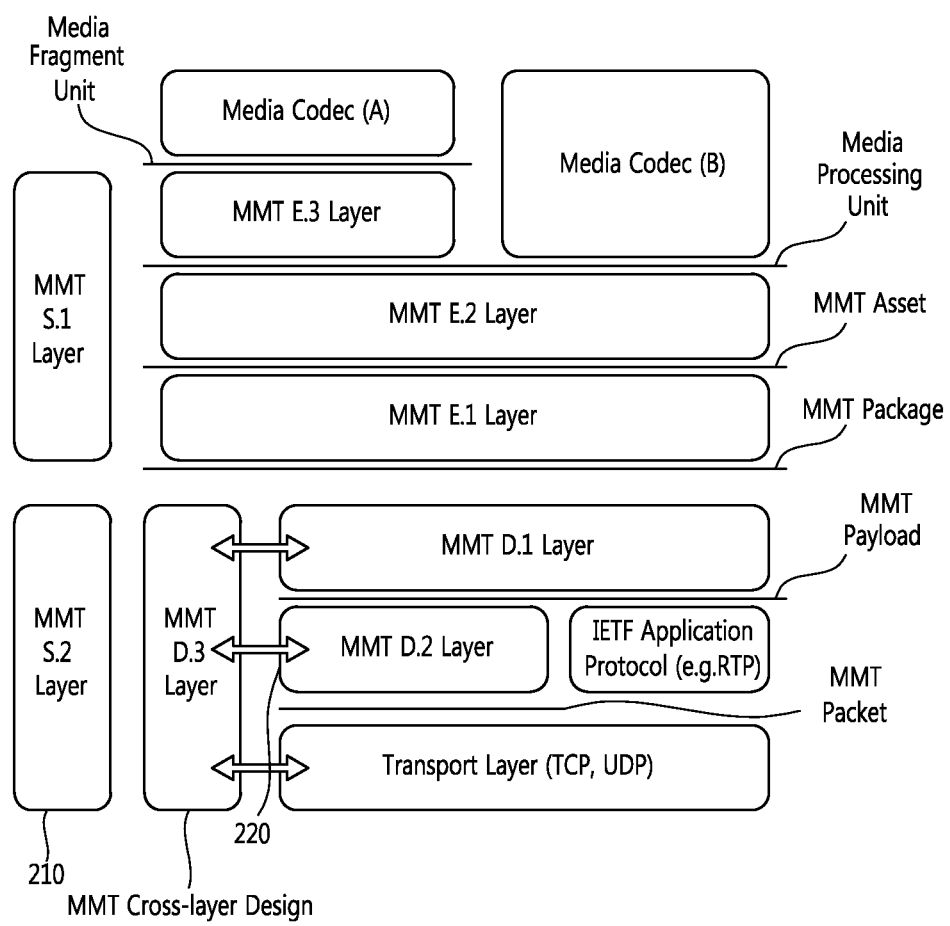
FIG. 1 is a conceptual diagram showing an MMT hierarchical structure according to an embodiment of the present invention.

The present invention may be modified in various manners and various embodiments are possible, and thus specific embodiments are illustrated in the drawings and are described in detail.

However, the description is not to limit specific embodiments, but should be understood as including all modifications, equivalents, and substitutes within the scope of the present invention.

Such terms as "first" and "second" may be used to described various elements, but the elements are limited by such terms. The terms are used only to distinguish one element from another. For example, the first element may be called the second element or the second element may be called the first element within the scope of the present invention. The expression "and/or" includes one or more a plurality of items.

When an element is mentioned as being connected or linked to another element, it may mean that the element is directly connected or linked to the another element, but it is also possible that further another element exists between the element and the another element. On the other hand, when an element is mentioned as being directly connected or directly linked to another element, it should be understood that there is no other element between the element and the another element.

The terms used in the present specification are used only to describe specific embodiments, but are not used to limit the scope of the present invention. A singular expression includes a plurality expression unless clearly stated otherwise. Such terms as "include" and "have" are used describe the fact that the features, numbers, steps, operations, parts, or a combination thereof exist, but are not used to exclude the possibility of existence or addition of other features, numbers, steps, operations, parts, or a combination thereof.

Unless defined otherwise, all terms used here including technical and scientific terms have the same meaning as that is generally understood by one of ordinary skill in the art. The terms which are generally used and are defined in a dictionary should be understood as having the meaning as that in the context of the related art, and unless clearly defined in the present specification, the terms should not be understood in an excessively idealistic or formalistic manner.

Hereinafter, embodiments of the present invention will be described in detail with reference to the attached drawings. When explaining the present invention, the same refer numeral is used to indicate the same element in the drawings for better understanding of the present invention, and the overlapping explanation for the same element is omitted.

Hereinafter, a content component, a content, a hybrid delivery, a presentation, a service, and service information are defined as follows.

A content component or a media component is defined as media of a single type or a subset of the media of a single type, for example, a video track, movie subtitles, or an enhancement layer of video.

The content is defined as a set of content components, such as a movie and a song.

The hybrid delivery is defined as simultaneously transmitting one or more content components through one or more physically different forms of networks.

A presentation is defined as an operation which is performed by one or more devices so that a user may experience one content component or one service (e.g., viewing a movie).

A service is defined as one or more content components which are transmitted for presentation or storage.

Service information is defined as metadata which describe one service, characteristics and components of the service.

Non-timed data is defined as all data elements which are consumed without inherent timeline. The non-timed data is data that do not have inherent synchronization information for decoding and/or expression of media units.

Timed data is data is data including inherent synchronization information for decoding and/or expression of media units, and is defined as data elements associated with inherent timeline which is decoded and presented.

An access unit (AU) is the smallest data entity capable of having time information.

A media fragment unit (MFU) a general container independent of any particular codec, and accommodates encoded media data which may be independently consumed by a media decoder. The AU includes one file for non-timed media data or media data which may be independently decoded by a media decoder such as the whole or part of the AU for timed media data. This accommodates information which may be used in a transport layer without a size which is the same as or smaller than that of the access unit.

The media processing unit is a generic container independent of any specific media codec, and is a general container for timed or non-timed data which may independently be decoded. Part of non-timed data or at least one AU of timed data is included along with information related to additional transmission and consumption. The processing of MPU means packetization for transmission or encapsulation as a package. The MPU is encoded media data which may be completely and independently processed. However, the MPU may not be independently and completely consumed in the media codec server in some cases for scalable video coding (SVC) and multi-view video coding (MVC).

An MMT asset is a logical data entity which is composed of at least one MPU along with the same MMT asset ID or is a logical data entity which is composed of a specific data mass along with a format defined in another standard. The MMT asset is a data entity including data with the same delivery characteristics.

MMT asset delivery characteristics (MMT-ADC) are description related to quality of service (QoS) requirement for transmitting the MMT asset. The MMT-ADC is expressed as a parameter which is not related to a specific delivery environment.

MMT composition information (MMT CI) explains spatial and temporal relationship between MMT assets.

An MMT entity is software or hardware implementation which follows the MMT profile.

An MMT packet is a formatted unit of data which is generated or consumed according to the MMT protocol.

An MMT package is a collection of logically structured data, and is composed of at least one MMT asset, MMT-composition information, MMT-asset delivery characteristics, and descriptive information.

An MMT payload is a formatted unit of data which carries a package or signals a message by using an MMT protocol or an Internet application layer transmission protocol (e.g., RTP).

The MMT protocol is an application layer transmission protocol for transmitting the MMT payload through an IP network.

The MMT payload format is a format for a payload of an MMT package or an MMT signaling message to be transmitted by an MMT protocol or an Internet application layer protocol (e.g., RTP).

Hereinafter, a first network or a second network includes various networks including a broadcast network, a broadband network, a cable network, or a satellite communication network.

Hereinafter, at the hybrid delivery, the content may be transmitted in MMT asset units, sub-stream units, MMT package units, or MMT packet units, or when the video content are composed of a plurality of layers including a first layer and a second layer, the content may be hybrid-transmitted in layer units.

FIG. 1 is a conceptual diagram showing an MMT hierarchical structure according to an embodiment of the present invention.

The MMT layer operates on a transport layer, and referring to FIG. 1, the mpeg media transport (MMT) layer structure includes a functional area of an encapsulation layer, a delivery layer, and a signaling layer.

The encapsulation layer (E-layer) may be composed of MMT E.1 layer, MMT E.2 layer, and MMT E.3 layer as illustrated in FIG. 1.

An encapsulation layer (E-layer) defines a format which encapsulates media components which are encoded in order to be stored in a storage device or to be transmitted as a payload. For example, the encapsulation layer may be in charge of the function of packetization, fragmentation, synchronization, multiplexing, etc. of transmitted media.

Various kinds of multimedia components may be encapsulated and combined so as to be transmitted and consumed by a function which is provided in an encapsulation layer. Capsulated media components and configuration information on media components are provided in the functional area of the encapsulation layer.

Main information on the encapsulated media components may include aggregation, prioritization, dependency of media fragments, timing information of MPU, and structure information, identification information of MMT asset 150, initialization information, and codec information. The configuration information of media components may include identification information of MMT package 160 and MMT asset 160, configuration information having the list of MMT asset 150, composition information 162 and asset delivery characteristics (ADC) of MMT assets 150 within the MMT package 160.

The encapsulation layer defines a logical structure of a format of a data unit to be processed by media content, MMT package, and MMT entity, and an implementation example to an ISO base media file format (ISOBMFF). In order to provide essential information for an adaptive delivery, the MMT package clearly states components including media content and their relationship. The format of the data units is defined to encapsulate encoded media for the storage and delivery and to be easily converted between the two formats.

E.3 layer generates a media processing unit (MPU) by encapsulating a media fragment unit (MFU) which is provided from a media codec A layer.

The encoded media data from the upper layer is encapsulated as MFU. The type and value of encoded media is abstracted so as to be generally used in a specific codec technology. This allows the lower layer to process the MFU without an approach to the encoded media, and the lower layer calls the required, encoded media data from the buffer of the storage or the network and transmits the called media data to the decoder. The MFU has a sufficient media part unit for performing the operation.

The MFU may become a picture or slice of a video. The MFU may have a format which may load a data unit which is independent to any specific codec and may be independently consumed in a media decoder. One or one group of a plurality of MFUs, which may be independently transmitted and decoded generate MPU. Non-timed media, which may be independently transmitted and executed, also generate the MPU. The MPU allows a quick access and partial consumption to the MFU by describing the inner structure such as the array and pattern of the MFU.

E.2 layer encapsulates the MPU generated in E.3 layer so as to generate an MMT asset.

The MMT asset is a data entity which is composed of one or a plurality of MPUs from a single data source, and it is a data unit in which composition information (CI) and asset delivery characteristics (ADC) are defined. The MPU sequence from the same source component generates the MMT asset. The MMT asset is packaged by the MMT package is formed with others by composition information and transport characteristics, is multiplexed with others by the MMT payload format, and is transmitted by the MMT protocol.

The MMT asset may correspond to packetized elementary streams (PES) and may correspond to video, audio, program information, MPEG-U widget, JPEG image, MPEG 4 file format, and MPEG transport stream.

E.1 layer encapsulates the MMT asset generated in E.2 so as to generate an MMT package.

The MMT asset is packaged with asset delivery characteristics (ADC) which select an appropriate delivery method for each MMT asset in order to satisfy the sensible quality of the MMT asset. Further, the MMT asset is packaged with MMT composition information (MMT-CI) for a later response of the same user experience along with other functional areas (transport area and signal area).

Figure 3:
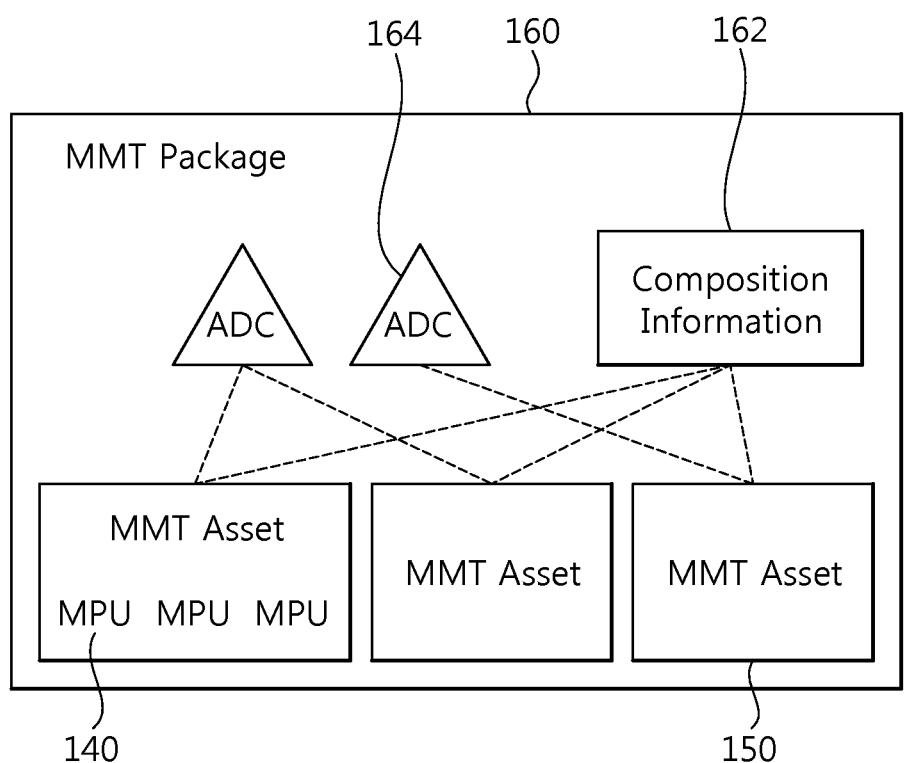
FIG. 3 is a conceptual diagram illustrating an extended example of an MMT packet format for hybrid transmission according to an embodiment of the present invention.

Referring to FIG. 3, the MMT package 160 includes a piece of composition information (CI) 162, at least one MMT asset 150, and asset delivery characteristics (ADC) 164 related to each asset. The MMT package may correspond to the program of MPEG-2 TS.

Further, the processing of the package is applied based on the MPU and the asset is at least one MPU set having the same asset ID, and it may also be understood that one package is composed of a piece of composition information, at least one MPU, and asset delivery characteristics related to each asset.

An asset may become an element of a package which encapsulates encoded media data such as audio, video, or web page data having timed or non-timed attributes.

Composition information includes information on relationship between MMT assets, and when one content is composed of a plurality of MMT packages, the composition information may further include information for indicating relationship between a plurality of MMT packages.

The asset delivery characteristics (ADC) 162 represents QoS request and statistics for the delivery of assets. A plurality of assets may be related to one ADC. The ADC may be used in setting the parameter of the MMT protocol and MMT payload by an entity which packetizes a package for an effective delivery.

Asset delivery characteristics (ADC) may include delivery characteristics information, which are needed in determining delivery conditions of MMT packet or MMT asset, such as, traffic description parameters and QoS descriptor.

The delivery layer (D-layer) defines a payload format and application layer transmission protocol. The payload format is defined to carry encoded media data regardless of a media type or encoding method. The application layer transmission protocol provides enhanced characteristics for a delivery of a package including cross layer communication and multiplexing.

The delivery layer (D-layer) is placed between the transport layer and the encapsulation layer and is in charge of multiplexing of media such as video and audio, aggregation and/or fragmentation of the packet level, network packetization, QoS control, synchronization function, and the interface with the transport layer such as the existing RTP, the transport layer such as the existing UDP and TCP, the encapsulation layer, and the signaling layer.

The delivery layer (D-layer) may perform a network flow multiplexing of a media which is transmitted through a network, a network packetization, QoS control, etc.

The delivery layer (D-layer) identifies a payload of different types which have been handed over from the encapsulation layer in order to handle payloads from the encapsulation layer.

The delivery layer (D-layer) may handle temporal relation between packets which are transmitted through different networks and different channels. The synchronization function may include a hybrid network synchronization by using a timestamp, etc.

The delivery layer (D-layer) may handle timing constraints of MMT delivery packets for real time media transmission.

The delivery layer (D-layer) may perform error control of MMT media packets such as forward error correction and retransmission.

The delivery layer (D-layer) may perform a flow control of MMT media packets.

The delivery layer (D-layer) may perform interaction with another MMT layer as well as the lower layers (MAC, PHY) through a cross-layer design for maintenance of QoS of a predetermined level for transmission of MMT media packets. Further, the delivery layer may provide a function for performing a group communication.

The delivery layer (D-layer) may be composed of an MMT D.1 layer, an MMT D.2 layer, and an MMT D.3 layer.

The D.1 layer receives an MMT package generated in E.1 layer so as to generate an MMT payload. The MMT payload is formed of an MMT payload format. The MMT payload format is a format of a payload for transmitting information for consumption by other existing application transmission protocols such as MMT application protocol or RTP. The MMT payload may include fragments of the MMT along with information such as AL-FEC.

The MMT payload format is defined as a generic payload format for packetization of content components of a package. The MMT payload format is defined regardless of a specific media codec, and any capsulated media like MPU may be packetized as a payload for an application layer transmission protocol which supports a streaming delivery of media content. The MMT payload may be used as a payload format for RTP, MMT, and another packet transmission protocol. The MMT payload may be used to packetize a signaling message.

D.2 layer receives an MMT payload generated in D.1 layer so as to generate an MMT packet. The MMT packet is a data format which is used in the application transmission protocol for MMT.

D.3 layer supports QoS by providing a function for exchanging information between layers by a cross-layer design. For example, D.3 layer may perform QoS by using QoS parameter of MAC/PHY layer. QoS parameter of MAC/PHY may become a bit rate, a packet loss ratio, an expected delay, and an available buffer size.

The signaling layer may be composed of MMT S.1 layer and MMT S.2 layer as illustrated in FIG. 1.

The signaling layer (S-layer) performs a signaling function. For example, the signaling layer may perform session initialization/control/management, a server-based and/or client-based trick mode, a service discovery, synchronization and another layer, i.e., a signaling function for an interface function with the delivery layer and encapsulation layer. The synchronization may include synchronization control in a hybrid network.

The signaling layer (S-layer) defines a message format which manages a delivery and consumption of the MMT package. A message for consumption management is used to notify the structure of the MMT package, and a message for delivery management is used to notify the structure of a payload format and a configuration of a protocol.

S.1 layer may define the format of control messages between applications for media expression presentation session management. The expression session management may define the format of a control message which is exchanged between applications in order to provide information which is required in media expression, session management, and media consumption. S.1 layer may perform an interface function with a service discovery, media session initialization/termination, media session presentation/control, delivery (D) layer and encapsulation (E) layer.

S.2 layer 210 may perform delivery session management. The delivery session management may define a format of a control message which is exchanged between end points of the delivery layer. The control message defined in the delivery session management may be used in a flow control, a delivery session management, delivery session monitoring, error control, and hybrid network synchronization control. S.2 layer 210 may provide signaling which is needed between a sender and a receiver in order to support the operation of the delivery layer. The signaling, which is needed between the sender and the receiver in order to support the operation of the delivery layer, may include a delivery session establishment and release, a delivery session management (monitoring, flow control, error control, etc.), resource reservation on a predetermined delivery session, signaling for hybrid network synchronization, and a signaling for an adaptive delivery. Further, S.2 layer 210 may be in charge of an interface function with the delivery layer and the encapsulation layer.

The control message (or control information) may be generated in the signaling layer so as to be transmitted through a broadcast network and/or a broadband network.

When transmitted through both the broadcast network and the broadband network, the function of the control message transmitted through the broadcast network may be the same as the function of the control message transmitted through the broadband network. The syntax and format of the control message may be changed according to the type of the application and delivery. For example, in the case of the hybrid transmission, the same common control information and the same common format may be used in the control message which is respectively transmitted to the broadcast network and the broadband network. Further, in the case of the hybrid transmission, the same common control information may be transmitted in a different format to each of the broadcast network and the broadband network. Further, in the case of the hybrid transmission, different control information and a different format may be used for each of the broadcast network and the broadband network.

Figure 2:
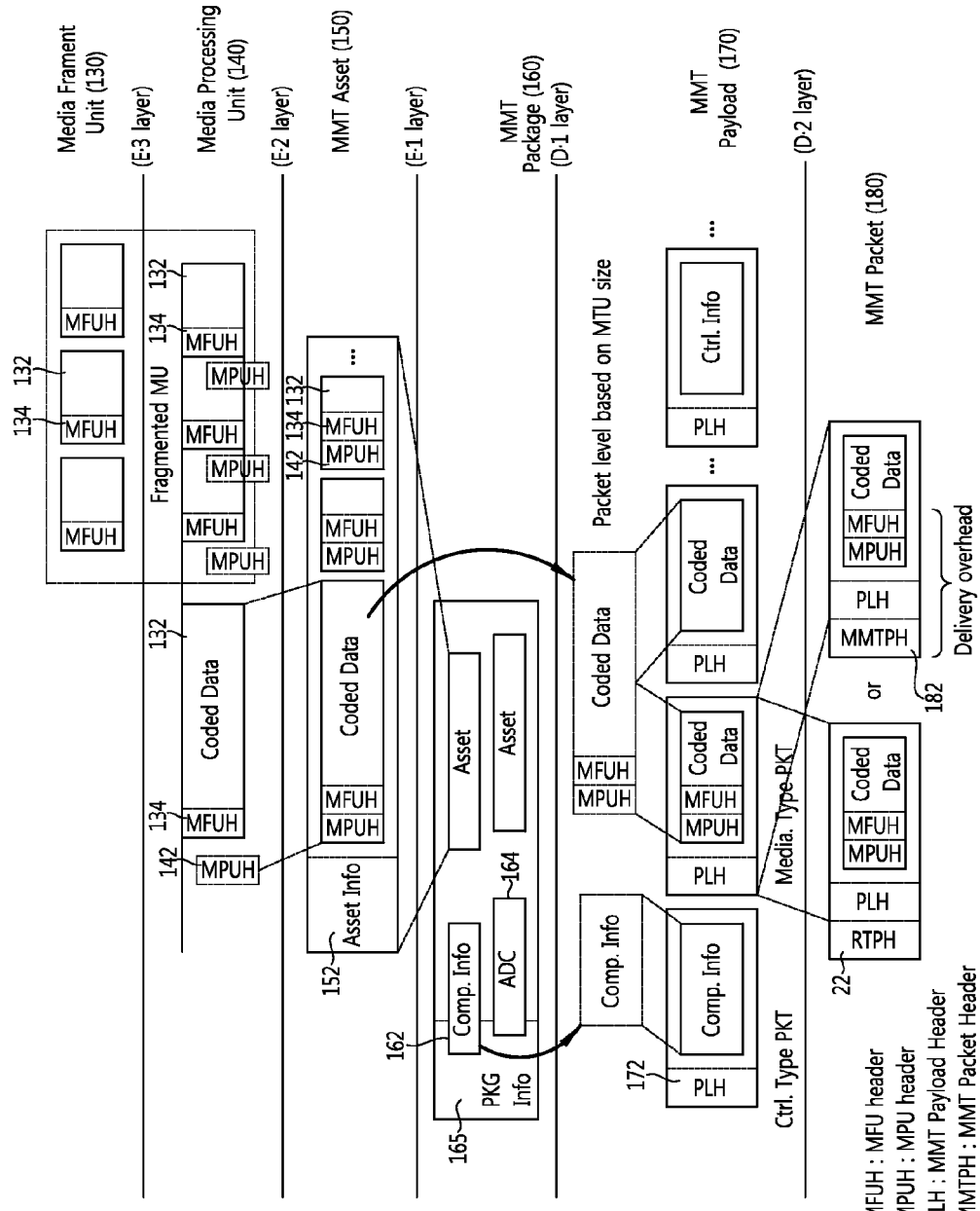
FIG. 2 shows a format of unit information (or data or packet) which is used for each layer of the MMT hierarchical structure of FIG. 1.

FIG. 2 shows a format of unit information (or data or packet) which is used for each layer of the MMT hierarchical structure of FIG. 1.

A media fragment unit (MFU) 130 is composed of coded media fragment data 132 and a media fragment unit header (MFUH) 134. The media fragment unit 130 has a general container format independent of a specific codec and loads the smallest data unit which may be independently consumed in the media decoder. The MFUH 134 may contain additional information such as media characteristics (e.g., a loss tolerance). The MFU 130 may be a picture of slice of a video.

The media fragment unit (MFU) defines a type which encapsulates the portion of AU in a transport layer in order to perform an adaptive delivery within the scope of MFU. The MFU may be used in transmitting a specific format of encoded media so that the portion of AU may be independently decoded or discarded.

The MFU includes an identifier for distinguishing one MFU and has general relation information between MFUs within a single AU. Dependency relation between MFUs within a single AU is explained and the MFU-related priority is explained as part of such information. The information may be used in handling transmission in the lower transport layer. For example, the transport layer may omit transmission of MFUs which may be discarded in order to support QoS transmission in an insufficient bandwidth.

An MPU is a set of media fragment units including a plurality of media fragment units 130. The MPU includes a general container format which is independent of a specific codec and includes media data which is equivalent to the access unit. The MPU may include a timed data unit or a non-timed data unit. The MPU may include a media processing unit header (MPUH) including additional information such as a timestamp for synchronization with media fragment unit data. The MPU includes data which is independently and completely processed by an object which follows MMT, and the process includes encapsulation and packetization. The MPU may be composed of at least one MFU or may have part of data including a format defined by another standard.

The MPU may be identified as unique by the sequence no. and the associated asset ID which distinguishes the MPU from other MPUs within the MMT package. A single MPU may accommodate at least one integral number of non-timed data. For timed data, the AU may be transmitted from at least one MFU, but one AU cannot be divided into a plurality of MPUs. In non-timed data, one MPU accommodates non-timed data part which is independently and completely processed by an object which follows the MMT.

The MPU includes at least one random access point. The first byte of the MPU payload may always be started with a random access point. In timed data, the fact implies that the decoding order of the first MFU is always 0 in the MPU payload. In timed data, the presentation period and decoding order of each AU may be sent to notify presentation time. The MPU does not have its initial presentation time and the presentation time of the first AU of one MPU may be described in composition information. The composition information may clearly state the first presentation time of MPU.

The MPU may include an MMT hint track. For the packetized delivery of MPU, the MMT hint track may provide information for converting the encapsulated MPU into the MMT payload and MMT packet.

The MMT hint track implies the fragmentation of the MPU in the transmission unit. As such, at least one MFU may be used to generate MMT payload. The media data may be generated and transmitted as MMT payload at the time of transmission by the transmission unit. Hence, the stored format may be different from a format at the time of delivery. In such a case, a dynamic transmission unit for extracting media data and generating an MMT payload at the time of transmission is required.

The MMT hint track implies MFU extraction and generation for encapsulation which uses MMT payload format. The MMT payload may include MPU metadata or at least one MFU. The MMT hint track implies a method of extracting MFU data in the transmission unit. If a fragmentation is not used, a hint track may be omitted.

The MMT hint track may represent an entry format of a sample. Each media sample is designated in at least one MFU and the sample of the MMT hint track generates at least one MFU.

The MMT hint track includes a plurality of parameters. For example, if the parameter value is 1, multilayer_flag indicating the provision of the multi-layer information may be included. The dependency_id is an ID indicating dependency of the MFU. If the value is not 0, the video is enhanced by at least one scalability level from at least one of temporal, qualitative, and spatial resolution perspectives. The depth_id indicates whether the MFU transmits the depth data of the video. The quality_id is the quality ID of MFU. If the value is not 0, the video is enhanced by at least one scalability level from at least one of temporal, qualitative, and spatial resolution perspectives. Temporal_id is a temporal ID of MFU. If the value is not 0, the video is enhanced by at least one scalability level from at least one of temporal, qualitative, and spatial resolution perspectives. The view_id is the view ID of MFU. If the value is not 0, the video is enhanced by at least one scalability level from at least one of temporal, qualitative, and spatial resolution perspectives. Further, the hint track may have layer_id parameter indicating the id of the scalable layer in which scalability dimensions information is provided as the initial information.

MMT asset 150 is a set of MPUs which are composed of a plurality of MPUs. The MMT asset 150 is a data entity which is composed of a plurality of MPUs (timed data or non-timed data) from a single data source, and the MMT asset information 152 may include additional information such as asset packaging metadata and a data type. The MMT asset 150 may include video, audio, program information, MPEG-U widget, JPEG image, MPEG4 file format (FF), packetized elementary streams, and MPEG transport streams.

Further, the MMT asset may be a logical data object having encoded media data. The MMT asset has the MMT asset header and encoded media data. The encoded media data may be a group of MPUs which are collectively referred to as the MMT asset ID. The data of the type which is respectively consumed as an object which is directly related with the MMT client may be a separated MMT asset. Some examples of such data types include MPEG-2 TS, PES, MP4 file, MPEG-U widget package, and JPEG file.

Encoded media of MMT asset may be timed data or non-timed data. The timed data is audio-visual media data which require synchronized decoding and presentation of specified data at designated time. The non-timed data is data of a data type which may be decoded and provided at an arbitrary time according to service provision and user interaction.

The service provider may integrate MMT assets and generate a multimedia service while putting the MMT assets in the space-time axis.

The MMT package 160 is a set of MMT assets including one or more MMT assets 150. The MMT assets within the MMT package may be multiplexed or concatenated like a chain.

The MMT package is a container format for MMT asset and configuration information. The MMT package provides the storage of MMT asset and configuration information for MMT program.

The MMT program provider generates configuration information by encapsulating encoded data as MMT asset and explaining MMT asset and the temporal and spatial layout of it transmission characteristics. MMT asset may be directly transmitted as a payload format. The configuration information may be transmitted by S.1 presentation session management message. However, the MMT program provider and client, which allow the relay or late reuse of MMT program, stores the MMT program in an MMT package format.

When parsing the MMT package, the MMT program provider determines the path through which the MMT asset is provided (e.g., a broadcast or broadband). The configuration information at the MMT package is transmitted to the S.1 presentation session management message along with transmission-related information.

The client receives the S.1 presentation session management message, thereby understanding possible MMT programs and how to receive the MMT asset for the MMT program.

The MMT package may also be transmitted by the D.1 payload format. The MMT package is packetized and transmitted as D.1 payload format. The client receives the packetized MMT package, forms part or whole thereof, and consumes the MMT program.

The package information 165 of the MMT package 160 may include configuration information. The configuration information may include additional information such as the list of MMT assets, package identification information, composition information 162, and asset delivery characteristics (ADC) 164. The composition information 162 includes information on the relationship between MMT assets 150.

Further, composition information 162 may further include information for indicating relationship between a plurality of MMT packages when one content is composed of a plurality of MMT packages. The composition information 162 may include information on temporal, spatial, and adaptive relationship within the MMT package. The composition information provides information for package delivery optimization and expression in a multi-screen environment. The information for mapping the asset in a specific screen may be indicated in a multi-screen environment, which will be described in detail later.

As in information for helping transmission and presentation of the MMT package, composition information in the MMT provides information on the spatial and temporal relationship between MMT assets within the MMT package.

MMT-CI is a descriptive language for extending HTML5 and providing such information. If HTML5 has been designed to described page-based presentation of text-based content, MMT-CI mainly expresses spatial relationship between sources. In order to support an expression which notifies temporal relationship between MMT assets, information related to MMT asset in the MMT package, time information which determines transmission and consumption order of MMT asset, and additional attributes of media elements for consuming various MMT assets in HTML5 may be added.

The asset delivery characteristics information 164 includes information on the delivery characteristics and may provide information needed to determine the delivery condition of each MMT asset (or MMT packet). Asset delivery characteristics may include a traffic description parameter and a QoS descriptor.

The traffic description parameter may include a media fragment unit (MFU) 130 or bitrate information for the MPU, and priority information. The bitrate information may include information on whether the MMT asset is a variable bitrate (VBR) or a constant bitrate (CBR), a bitrate which is guaranteed for a media fragment unit (MFU) (or MPU), and the maximum bitrate for the MFU. The traffic description parameter may be used for resource reservation between a server, a client, and other elements on the delivery path, and may include the maximum size information of the media fragment unit (MFU) within the MMT asset. The traffic description parameter may be periodically or non-periodically updated.

QoS descriptor includes information for QoS control and may include delay information and loss information. The loss information may include a loss indicator on whether the delivery loss of the MMT asset is allowed. For example, when the loss indicator is 1, it indicates "lossless", and when the loss indicator is 0, it indicates "lossy." The delay information may include a delay indicator which is used in distinguishing the sensitivity of the transmission delay of the MMT asset. The delay indicator may indicate whether the type of the MMT asset is conversation, interactive, real time, and non-real time.

One content may be composed of one MMT package. Further, one content may be composed of a plurality of MMT packages.

When one content is composed of a plurality of MMT packages, composition information or configuration information indicating temporal, spatial, and adaptive relationship between a plurality of MMT packages may exist inside or outside one MMT package.

For example, in the case of the hybrid delivery, some of content components are transmitted through a broadcast network and the remaining part of the content components may be transmitted through a broadband network or another broadcast network. For example, in the case of a plurality of audiovisual (AV) streams which form one multi-view service, one stream may be transmitted through a broadcast network, another stream may be transmitted through a broadband network, and each AV stream may be multiplexed and individually received in the client terminal so as to be stored. For example, application software such as a widget is transmitted through a broadband network, and the AV stream (AV program) may exist as a scenario which is transmitted to the existing broadcast network. In another example, one media component may be transmitted through a broadband network, and another media component may be transmitted through another broadband network.

In the case of the above-described multi-view service scenario and/or widget scenario, a plurality of AV streams may become one MMT package, and in this case, one of a plurality of streams may be stored in only one client terminal, the storage content becomes part of the MMT package, the client terminal needs to rerecord composition information or configuration information, and the rerecorded content becomes a new MMT package which is unrelated with the server.

In the case of the multi-view service scenario and/or widget scenario, each AV stream may become one MMT package, and in this case, a plurality of MMT package forms one content, are recorded in MMT package units, and need composition information or configuration information indicating relationship between MMT packages.

Composition information or configuration information included in one MMT package may refer to MMT assets within another MMT package and may express the external side of the MMT package which refers to the MMT package in the out-band situation.

Further, in order to inform a client terminal of the list of MMT assets 160 provided by the service provider and delivery of the MMT package 160, the MMT package 160 may be translated as service discovery information through a signaling (S) layer and may include information table for a service discovery in the MMT control message.

A server, which divides multimedia content into a plurality of segments, allocates URL information to a plurality of segments, stores URL information on each segment in the media information file, and transmits the URL information to the client.

The media information file may be called as various names such as media presentation description (MPD) or a manifest file depending on the standardization organization which standardizes HTTP streaming. Hereinafter, the media information file is indicated as a media expression description (MPD) and is described.

A basic concept of a hybrid delivery is for combining media components in different channels. Hereinafter, some examples of the hybrid delivery which is performed in a hybrid transmission system will be described.

Figure 4:
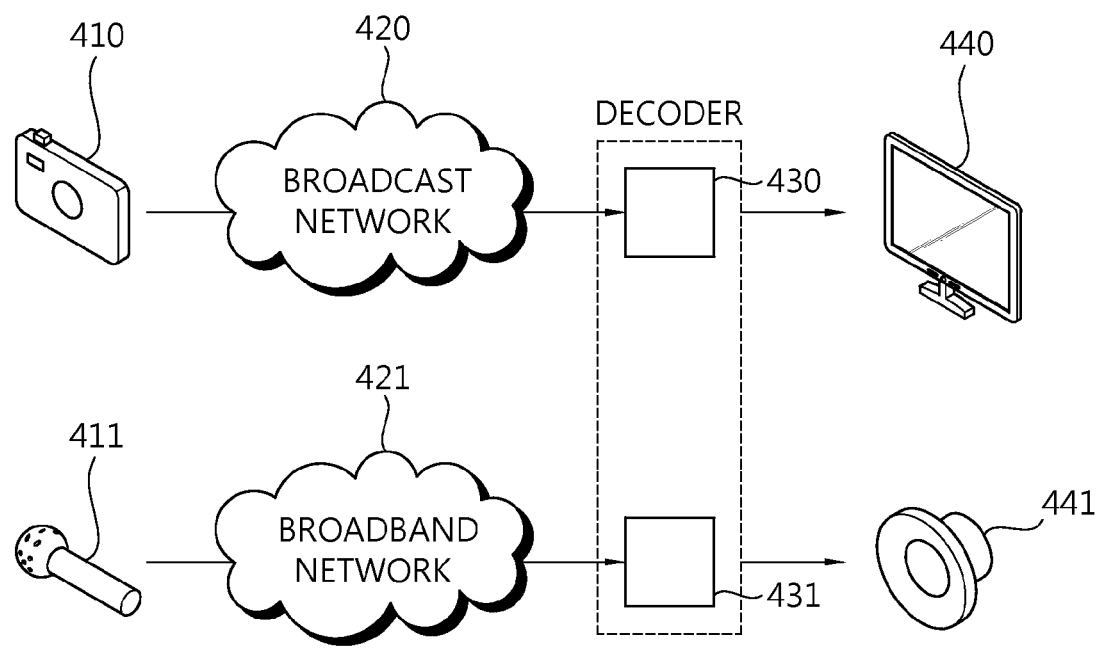
FIG. 4 illustrates an example where a streaming component is hybrid-transmitted by using a broadcast network and a broadband network in a hybrid transmission system according to an embodiment of the present invention.

FIG. 4 illustrates an example where a streaming component is hybrid-transmitted by using a broadcast network and a broadband network in a hybrid transmission system according to an embodiment of the present invention.

Referring to FIG. 4, a hybrid transmission method according to an embodiment of the present invention may transmit video data 410 through a broadcast network 420 and transmit audio data 411 through a broadband 421, and reversely transmit video data 410 through the broadband network 421 and audio data 411 through the broadcast network 420. In an embodiment illustrated in FIG. 4, video data 410 and audio data 411 may be respectively decoded in a separate decoder 430. For example, the video data 410 may be decoded in the video decoder 430 so as to be transmitted to the display device 440 and then be displayed, and the audio data 411 may be decoded in the audio decoder 431 so as to be replayed as sounds through the speaker 441.

At this time, the display device 440 and the speaker 441 may provide synchronized presentation. That is, video and audio may have been transmitted through separate paths, but may be temporally synchronized in the presentation operation so as to be provided to the user.

Figure 5:
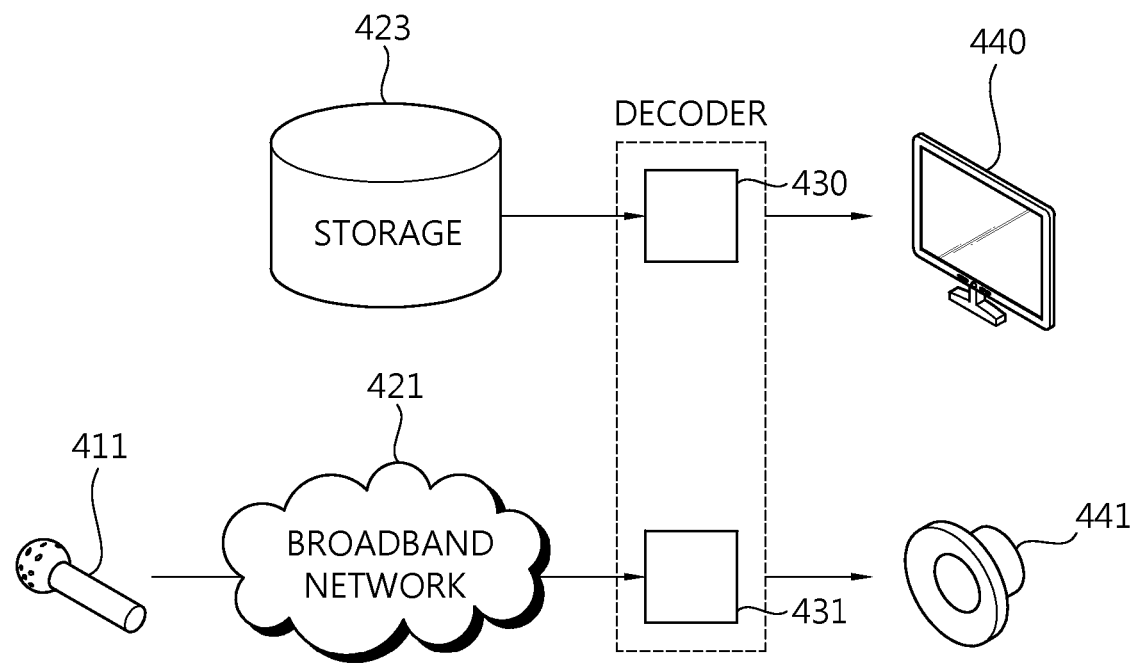
FIG. 5 illustrates an example where a transmitted streaming component is hybrid-transmitted by using an already stored component and a broadcast network or broadband network in a hybrid transmission system according to another embodiment of the present invention.

FIG. 5 illustrates an example where a transmitted streaming component is hybrid-transmitted by using an already stored component and a broadcast network or broadband network in a hybrid transmission system according to another embodiment of the present invention. The embodiment of FIG. 5 is the same as that of FIG. 4 except for the fact that some data is transmitted in the storage 423. In the embodiment of FIG. 5, video data is transmitted from the storage 423, and audio data 411 is transmitted through a broadband network 421.

Figure 6:
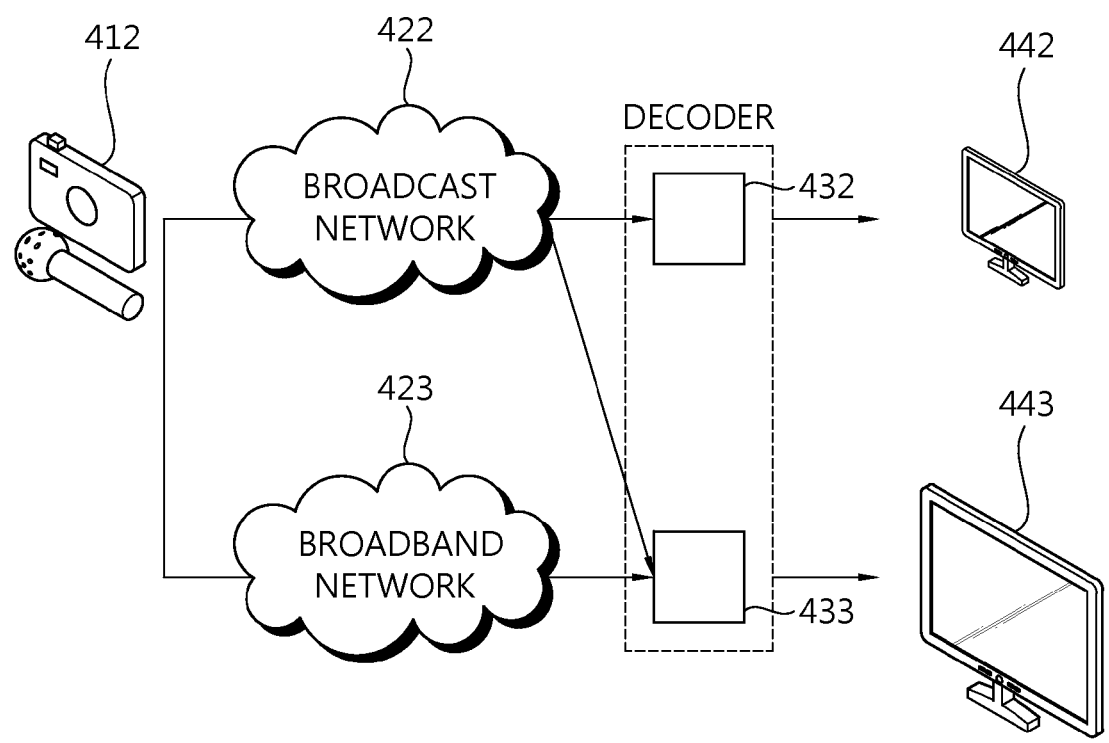
FIG. 6 illustrates an example where a streaming component, which is provided as hierarchical media data in a hybrid transmission system, is hybrid-transmitted through a broadcast network and a broadband network according to another embodiment of the present invention.

FIG. 6 illustrates an example where a streaming component, which is provided as hierarchical media data in a hybrid transmission system, is hybrid-transmitted through a broadcast network and a broadband network according to another embodiment of the present invention. In the embodiment of FIG. 6, video data and audio data are generated together as media data and are transmitted together. The embodiment of FIG. 6 illustrates a case of hierarchical video transmission.

Data of the basic layer, which is the minimum data of the hierarchical media data 412, is transmitted through a broadcast network 422 and the data of the extension layer having additional information of the hierarchical media data 412 are transmitted by using the broadcast network 423.

The first decoder 432 receives only media data which is provided from the broadcast network 422. Hence, low quality media 442 is provided by receiving only the data of the basic layer.

The second decoder 433 is provided basic layer data provided from the broadcast network 422 and extended layer data provided from the broadband network 423 so as to provide high quality media 443. The second decoder may perform synchronization in the decode level in order to use the basic layer data and extended layer data together.

Embodiments illustrated in FIGS. 4 to 6 describe an example of combing media data of the same format which is provided in different transmission networks, but data of different formats may be combined in a decoder level and may be expressed in a presentation level. For example, MMT component and a component of a different format such as MPEG-2 TS may be decoded by being combined or may be separately decoded, and then may be displayed by synchronizing in the presentation level.

Figure 7:
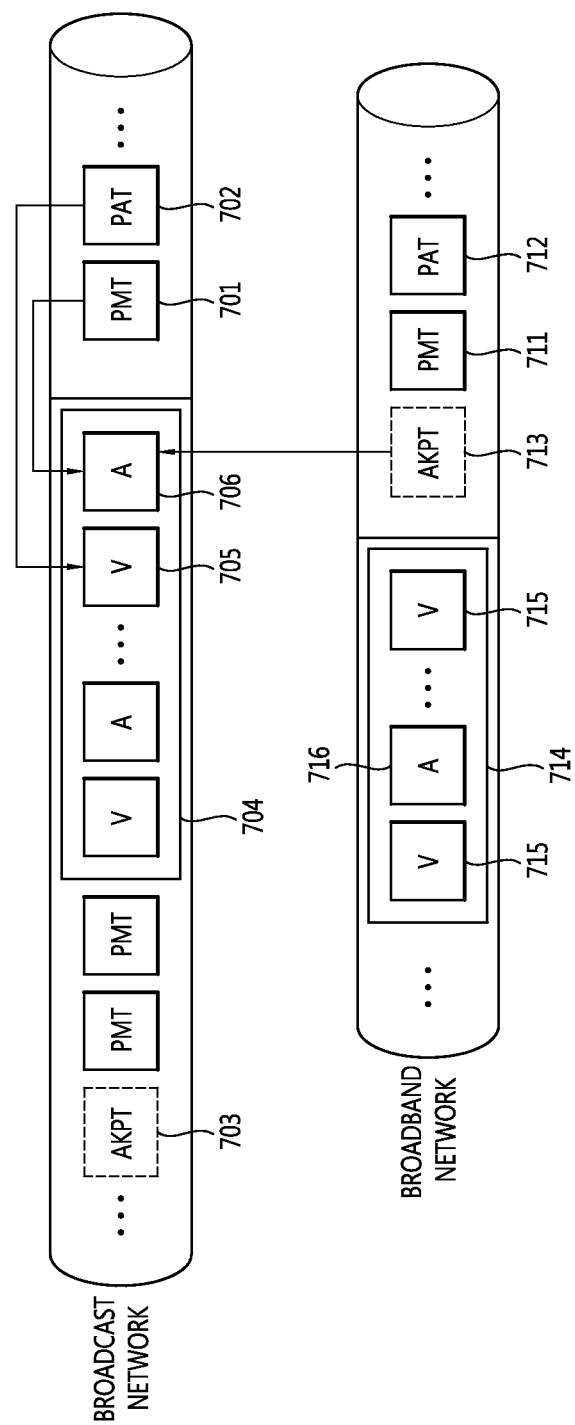
FIG. 7 is a conceptual diagram illustrating an extended example of an MMT packet format for a hybrid transmission according to an embodiment of the present invention.

FIG. 7 is a conceptual diagram illustrating an extended example of an MMT packet format for a hybrid transmission according to an embodiment of the present invention.

Referring to FIG. 7, an MMT packet, which is transmitted through a broadcast network, includes a content component 704 including header, video 705 and audio 706 data including at least one of a program map table (PMT) 701, a program allocation table (PAT) 702, and an advanced program map table (APMT) 701.

The PMT 701 indicates content about elementary streams (ES) such as video and audio and program specific information (PS) which are included in one program. PSI includes PID of ESs.

PMT 701 information is transmitted to a TS packet having PMT_PID, which is designated in the PAT 702, as PID. Here, the program is a set of elementary steams (ES) having the same time criterion value.

PAT 702 and PMT 701 are information needed for compatibility with MPEG2 TS and have the same value as PAT and PMT which are used in MPEG2 TS.

APMT 703 is information needed for hybrid transmission by extension of MPEG2 TS and is included in a broadcast network or broadband MMT packet so as to be transmitted.

For example, the APMT 703 performs a role of indicating the specific location where the English audio corresponding to a Korean audio exists in the broadband network in the Korean audio of the broadcast network. Further, the APMT 703 may indicate the specification location of the video or audio related to the video in the broadband network related to the video of the broadcast network.

Further, the APMT 703 may include information associated with the content or corresponding broadcast content such as a broadcast channel, broadcast time, and broadcast length. Hence, when the real time broadcast time of the specific VOD content gets close or the real time broadcast is started while viewing specific VOD content (e.g., a Korean program "I am Singer") through a broadband network such as IP network (Internet), APMT 703 may indicate the specific location of real time broadcast content (e.g., real time video and audio data of "I am Singer") associated with the specific VOD content in the broadcast network through information such as PID or ID of TS. Hence, information on content corresponding to specific content may be provided to the user through a broadcast network while viewing specific VID content through a broadband network.

A program map table (PMT) 701, a program allocation table (PAT) 702, and an advanced program map table (APMT) 703, and information of broadcast content related to the content may be included in one of MMT packet, header of MMT packet, MMT payload, MMT payload header, MMT asset, MMT asset header, ADC, MMT-CI, MPU, and MFU.

Figure 8:
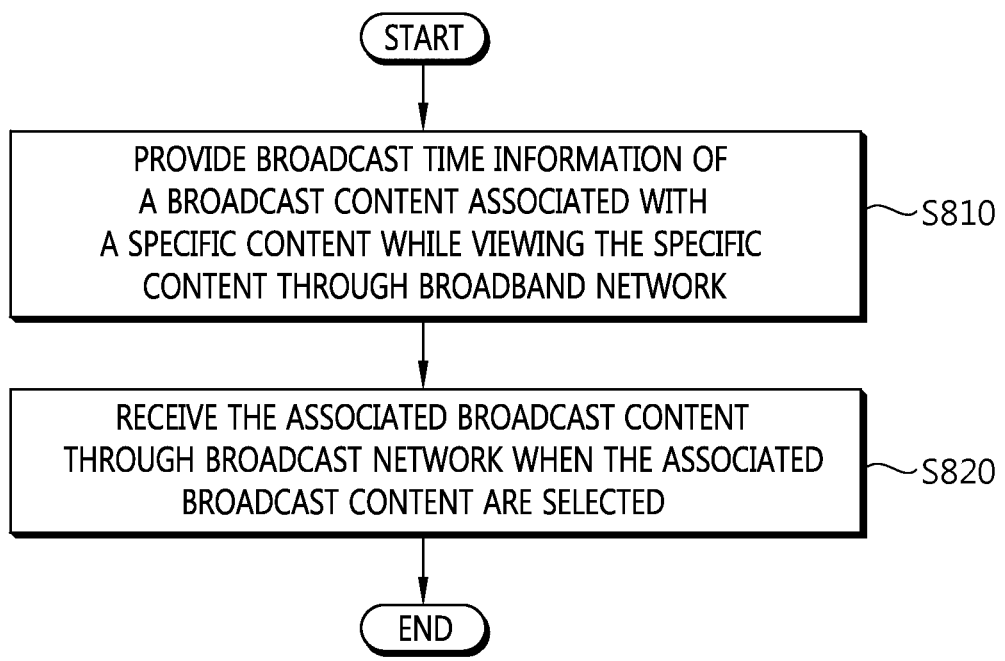
FIG. 8 is a flowchart illustrating a hybrid transmission method by using an extension of an MMT packet format according to an embodiment of the present invention.

FIG. 8 is a flowchart illustrating a hybrid transmission method by using an extension of an MMT packet format according to an embodiment of the present invention.

Referring to FIG. 8, the hybrid transmission method according to an embodiment of the present invention may provide information on broadcast content associated with or corresponding to the specific content while viewing specific VOD content through a broadband network (S810) and transmit the associated broadcast content to the user through the broadcast network when the associated broadcast content are selected, thereby allowing the user to receive and view the associated broadcast content (S820).

Figure 9:
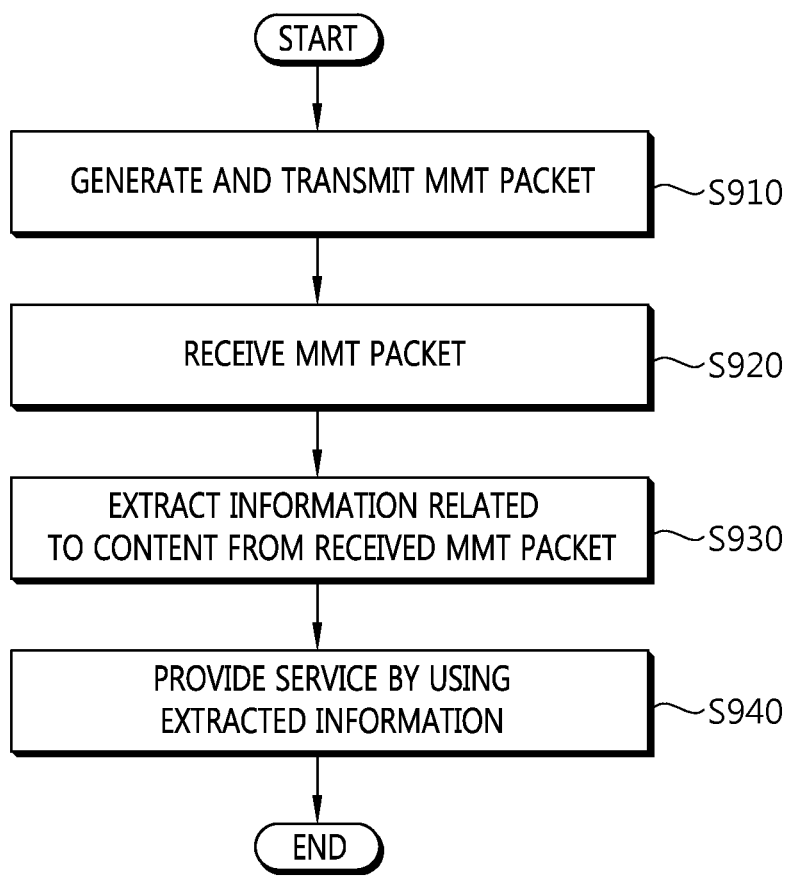
FIG. 9 is a flowchart illustrating a process of MMT packet transmission in a hybrid transmission system according to an embodiment of the present invention.

FIG. 9 is a flowchart illustrating a process of MMT packet transmission in a hybrid transmission system according to an embodiment of the present invention. Hereinafter, MMT packet transmission in a hybrid transmission according to an embodiment of the present invention will be described with reference to FIG. 9.

First, the hybrid transmission device according to an embodiment of the present invention generates an MMT packet including video and audio data of a first content, related PAT, PSI, PMT, APMT, and information on the related broadcast content, and transmits the generated MMT packet to the hybrid reception device by using at least one of the broadband network and the broadcast network (S910). Here, the generated MMT packet may be transmitted by using both the broadband network and the broadcast network. The MMT packet is generated through the MMT packet generation unit and is transmitted through the MMT packet transmission unit.

Thereafter, the hybrid reception device according to an embodiment of the present invention receives a transmitted MMT packet (S920). The hybrid reception device according to an embodiment of the present invention receives an MMT packet by using the MMT reception unit. Here, the MMT packet may be received from at least one of the data storage, the broadband network, and the broadcast network. For example, some may be transmitted from the broadband network and others may be transmitted from the broadcast network. Further, some may be transmitted from the storage.

Thereafter, the hybrid reception device according to an embodiment of the present invention extracts information related to the content from the received MMT packet (S930). The content-related information may be one of PAT, PMT, APMT, and information of other broadcast content related to the content.

Thereafter, the hybrid reception device according to an embodiment of the present invention provides a service by using extracted information (S930). For example, when broadcast content associated with the first content is selected, the hybrid reception device according to an embodiment of the present invention receives the broadcast content associated with the first contents. The hybrid reception device according to an embodiment of the present invention receives the broadcast content by using at least one of a broadcast network and a broadband network by referring to the related information of the broadcast content. The reception of the broadcast content may be started at the provision time of the broadcast content, and the hybrid reception device may provide a live broadcast program to the user by receiving the broadcast content in real time at provision time of the broadcast content.

Further, the hybrid reception device according to an embodiment of the present invention may receive the broadcast content and the received broadcast content may be stored in a data storage without being displayed.

The above-described present invention has been described based on a series of functional blocks, but it is not limited by the above-described embodiment and attached drawings, and it is obvious to one of ordinary skill in the art that embodiments may be substituted, modified, and changed within the scope of the technical concept of the present invention.

The combination of the above-described embodiments is not limited to the above-described embodiments, and various forms of combinations as well as the above-described embodiments may be provided according to implementation and/or need.

That is, as MANE controls the MMT packet transmission by using the above-described extended information, the multi-layer video server 410 may control transmission of the MMT packet by using extension information.

In the above-described embodiments, methods are described based on a flowchart as a series of operations or blocks, but the present invention is not limited to the order of operations, and some operations may be performed in a different other or simultaneously. Further, one of ordinary skill in the art would easily understand that operations in the flowchart are not exclusive, another operation may be added, or one or more operations in the flowchart may be deleted without affecting the scope of the present invention.

The above-described embodiments include various forms of examples. It is not possible to describe all possible combinations for indicating various forms, but one of ordinary skill in the art would easily recognize the possibility of other combinations. Hence, it should be understood that the present invention includes all other substitutions, modifications, and changes within the scope of claims below.

What is claimed is:

1. A hybrid transmission method which uses heterogeneous network including at least one of a broadcast network or a broadband network, the hybrid transmission method comprising:
    transmitting an MPEG Multimedia Transport (MMT) packet of a first content through the heterogeneous network,
    wherein the transmitting the MMT packet of the first content further comprises:
        generating media processing unit (MPU) by encapsulating media fragment unit (MFU) being smaller than an access unit (AU) and contained data processed by a media decoder, the MPU being a container for independently decodable timed or non-timed data;
        generating an MMT asset based on at least one MPU, the MMT asset being a logical grouping of MPUs that share the same asset ID;
        generating MMT package including at least one MMT asset, the composition information (CI) and transport characteristics (TC); and
        generating MMT packet by adding an MMT packet header to MMT payload generated by referring to the MMT package,
    wherein the composition information comprises information on spatial and temporal relationship among the MMT assets, and
    the MPU comprises an MMT hint track including information on converting the encapsulated MPU into the MMT payload and MMT packet, and
    wherein the MMT hint track provides hint for extracting and building of the MFU for encapsulation using the MMT payload format.

2. The hybrid transmission method of claim 1, wherein if a fragmentation is not used, the MMT hint track is omitted.

3. The hybrid transmission method of claim 1, wherein the MMT hint track represents an entry format of a sample.

4. The hybrid transmission method of claim 1, wherein the MPU includes MPU sequence number let the MPU be distinguished from other MPU in the asset,
    wherein the MPU is identified by the MPU sequence number and an associated asset ID.

5. The hybrid transmission method of claim 1, wherein the MMT hint track includes a multilayer_flag indicating the provision of the multi-layer information is included.

6. The hybrid transmission method of claim 1, wherein the MMT hint track includes a dependency_id being an identification indicating dependency of the MFU.

7. The hybrid transmission method of claim 6, wherein if the value of the dependency_id is not 0, a video related to the first content is enhanced by at least one scalability level in at least one of temporal, quality, and spatial resolution perspectives.

8. The hybrid transmission method of claim 1, wherein the MMT hint track includes a depth_id indicating whether the MFU transmits depth data of the video related to the first content.

9. The hybrid transmission method of claim 1, wherein the MMT hint track includes the quality id being a quality identification of the MFU,
    and wherein if the value of the quality_id is not 0, the video related to the first content is enhanced by at least one scalability level in at least one of temporal, quality, and spatial resolution perspectives.

10. The hybrid transmission method of claim 1, wherein the MMT hint track includes a temporal_id being a temporal identification of the MFU.

11. The hybrid transmission method of claim 1, wherein the MMT hint track includes a view id is a view identification of the MFU.

12. The hybrid transmission method of claim 1, wherein the MMT hint track includes a layer_id indicating an identification of a scalable layer in which scalability dimensions information is provided in the initialization information.

13. A hybrid reception method which uses heterogeneous network including at least one of a broadcast network or a broadband network, the hybrid reception method comprising:
    receiving an MPEG Multimedia Transport (MMT) packet of a first content through the heterogeneous network,
    wherein the MMT packet is generated by
        generating media processing unit (MPU) by encapsulating media fragment unit (MFU) being smaller than an access unit (AU) and contained data processed by a media decoder, generating an MMT asset based on at least one MPU,
generating MMT package including at least one MMT asset, the composition information (CI) and transport characteristics (TC), and
adding an MMT packet header to MMT payload generated by referring to the MMT package, the MPU being a container for independently decodable timed or non-timed data and the MMT asset being a logical grouping of MPUs that share the same asset ID,
wherein the composition information comprises information on spatial and temporal relationship among the MMT assets,
wherein the MPU comprises an MMT hint track including information on converting the encapsulated MPU into the MMT payload and MMT packet, and
wherein the MMT hint track provides hint for extracting and building of the MFU for encapsulation using the MMT payload format.

14. The hybrid reception method of claim 13, wherein the first content is received by using at least one selected from the group consisting of a data storage, a broadband network and a broadcast network.

15. The hybrid reception method of claim 13, wherein information associated with the first content is transmitted as information of a broadcast content associated with the first content.

16. The hybrid reception method of claim 15, wherein the information associated with the first content further comprises
a broadcast content associated with the first content,
wherein the broadcast content is received when the broadcast content associated with the first content is selected.

17. The hybrid reception method of claim 16, wherein the broadcast content associated with the first content is received along with the first content.

18. The hybrid reception method of claim 16, wherein the broadcast content associated with the first content is received in real time at the time of providing the broadcast content.

19. The hybrid reception method of claim 16, wherein the broadcast content associated with the first content is stored.

20. The hybrid reception method of claim 13, wherein the information associated with the first content is included in at least one selected from the group consisting of the MMT packet, the MMT packet header, the MMT payload, an MMT payload header, the MMT asset, an MMT asset header, asset delivery characteristics (ADC), MMT-composition information (MMT-CI), the MPU, and the MFU.

21. The hybrid reception method of claim 13, wherein the information associated with the first content is at least one selected from the group consisting of program specific information (PSI), a program association table (PAT), a program map table (PMT), an advanced program map table (APMT), and a program ID (PID).

22. A hybrid transmission device which uses heterogeneous network including at least one of a broadcast network or a broadband network, the hybrid transmission device comprising:
at least one processor that executes non-transitory computer program code stored on storage media, wherein the non-transitory computer program code includes instructions to execute:
receiving an MPEG Media Transport (MMT) payload, and generating an MMT packet by
generating media processing unit (MPU) by encapsulating media fragment unit (MFU) being smaller than an access unit (AU) and contained data processed by a media decoder,
generating an MMT asset based on at least one MPU,
generating MMT package including at least one MMT asset, the composition information (CI) and transport characteristics (TC), and
adding an MMT packet header to MMT payload generated by referring to the MMT package, the MPU being a container for independently decodable timed or non-timed data and the MMT asset being a logical grouping of MPUs that share the same asset ID; and
transmitting the generated MMT packet,
wherein the composition information comprises information on spatial and temporal relationship among the MMT assets, and
the MPU comprises an MMT hint track including information on converting the encapsulated MPU into the MMT payload and MMT packet, and
wherein the MMT hint track provides hint for extracting and building of the MFU for encapsulation using the MMT payload forma.

23. The hybrid transmission device of claim 22, wherein the MMT packet transmission unit transmits the MMT packet by using at least one selected from the group consisting of a data storage, a broadband network and a broadcast network.

24. A hybrid reception device which uses heterogeneous network including at least one of a broadcast network or a broadband network, the hybrid reception device comprising:
at least one processor that executes non-transitory computer program code stored on storage media, wherein the non-transitory computer program code includes instructions to execute:
receiving an MPEG Media Transport (MMT) packet of a first content,
wherein the MMT packet is generated by
generating media processing unit (MPU) by encapsulating media fragment unit (MFU) being smaller than an access unit (AU) and contained data processed by a media decoder,
generating an MMT asset based on at least one MPU,
generating MMT package including at least one MMT asset, the composition information (CI) and transport characteristics (TC), and
adding an MMT packet header to MMT payload generated by referring to the MMT package, the MPU being a container for independently decodable timed or non-timed data and the MMT asset being a logical grouping of MPUs that share the same asset ID and the MMT asset being a logical grouping of MPUs that share the same asset ID,
wherein the composition information comprises information on spatial and temporal relationship among the MMT assets, and
the MPU comprises an MMT hint track including information on converting the encapsulated MPU into the MMT payload and MMT packet, and
wherein the MMT hint track provides hint for extracting and building of the MFU for encapsulation using the MMT payload format.

25. The hybrid reception device of claim 24, wherein the MMT packet reception unit receives the MMT packet by using at least one selected from the group consisting of a data storage, a broadband network and a broadcast network.

26. The hybrid reception device of claim 24, wherein information associated with the first content is information of a broadcast content associated with the first content.

27. The hybrid reception device of claim 26, wherein the MMT reception unit is configured to receive the MMT packet including a broadcast content associated with the first content when the broadcast content associated with the first content is selected.

28. The hybrid reception device of claim 27, wherein the MMT reception unit is configured to receive the MMT packet including the broadcast content associated with the first content in real time according to the provision time of the broadcast content.

29. The hybrid reception device of claim 24, further comprises:
   a data storage configured to store the broadcast content which is generated from the MMT packet including the broadcast content associated with the first content.

30. The hybrid reception device of claim 24, wherein the information associated with the first content is included in at least one selected from the group consisting of the MMT packet, the MMT packet header, the MMT payload, an MMT payload header, the MMT asset, an MMT asset header, asset delivery characteristics (ADC), MMT-composition information (MMT-CI), the MPU, and the MFU.

31. The hybrid reception device of claim 24, wherein the information associated with the first content is at least one selected from the group consisting of program specific information (PSI), a program association table (PAT), a program map table (PMT), an advanced program map table (APMT), and a program ID (PID).

* * * * *

UNITED STATES PATENT AND TRADEMARK OFFICE
CERTIFICATE OF CORRECTION

PATENT NO. : 9,544,641 B2
APPLICATION NO. : 14/395748
DATED : January 10, 2017
INVENTOR(S) : Alex Chungku Yie et al.

It is certified that error appears in the above-identified patent and that said Letters Patent is hereby corrected as shown below:

On the Title Page

Item (22):
PCT Filed "May 5, 2013" should read "May 10, 2013".

Signed and Sealed this
Sixteenth Day of May, 2017

Michelle K. Lee
*Director of the United States Patent and Trademark Office*